United States Patent
Wysocki et al.

[15] 3,642,348
[45] Feb. 15, 1972

[54] IMAGING SYSTEM

[72] Inventors: Joseph J. Wysocki; James E. Adams, both of Webster; Robert W. Madrid, Macedon, all of N.Y.

[73] Assignee: Xerox Corporation, Rochester, N.Y.

[22] Filed: Oct. 20, 1969

[21] Appl. No.: 867,593

[52] U.S. Cl. ............................................. 350/160, 350/320
[51] Int. Cl. ......................................................... G02f 1/28
[58] Field of Search ................................. 350/150, 160, 320

[56] References Cited

FOREIGN PATENTS OR APPLICATIONS 1,123,117  8/1968  Great Britain .......................... 350/160

*Primary Examiner*—Ronald L. Wibert
*Assistant Examiner*—J. Rothenberg
*Attorney*—James J. Ralabate, David C. Petre and Roger W. Parkhurst

[57] ABSTRACT

A system which transforms a cholesteric liquid crystalline material from its Grandjean or "disturbed" texture state to its focal-conic or "undisturbed" texture state by an applied electrical field, and an imaging system wherein a cholesteric liquid crystalline member is imaged in a desired image configuration by the electric field-induced texture transition system.

6 Claims, 4 Drawing Figures

PATENTED FEB 15 1972 3,642,348

INVENTORS
JOSEPH J. WYSOCKI
JAMES E. ADAMS
BY ROBERT W. MADRID

Roger W. Parkhurst
ATTORNEY

IMAGING SYSTEM

BACKGROUND OF THE INVENTION

This invention relates to imaging systems, and more specifically, to an imaging system wherein the imaging member comprises a liquid crystalline substance.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic, and cholesteric forms. These structural forms are sometimes referred to as mesophases, thereby indicating they are states of matter intermediate between the liquid and crystalline states. The three mesophase forms of liquid crystals mentioned above are characterized by different structures wherein the molecules of the compound are arranged in a molecular structure which is unique to each of the three mesomorphic structures. Each of these structures is well known in the liquid crystal art.

Liquid crystals have been found to be sensitive or responsive to temperature, pressure, foreign chemical compounds, and to electric and magnetic fields, as disclosed in copending applications (which are commonly assigned to the assignee of the instant application) Ser. No. 646,532, filed June 16, 1967, and Ser. No. 646,533, now abandoned filed June 16, 1967, Fergason et al. U.S. Pat. No. 3,114,838, French Pat. No. 1,484,584, and Fergason U.S. Pat. No. 3,409,404. A liquid crystal imaging system similar to the present imaging system is disclosed in copending application Ser. No. 821,565, filed May 5, 1969.

Cholesteric liquid crystals are also known to exhibit various observable textures. For example, cholesteric liquid crystals may adopt a homoeotropic, a focal-conic, or a Grandjean plane texture as modifications of the cholesteric mesophase itself, as described in Gray, G. W., *Molecular Structure and the Properties of Liquid Crystals*, Academic Press, London, 1962, pp. 39–54.

In new and growing areas of technology such as liquid crystalline imaging systems, new methods apparatus, compositions, and articles of manufacture are often discovered for the application of the new technology in a new mode. The present invention relates to a new and advantageous system for imaging liquid crystalline members.

SUMMARY OF THE INVENTION

It is, therefore, an object of this invention to provide a novel imaging system.

It is another object of this invention to provide a novel liquid crystal imaging system.

It is another object of this invention to provide an imaging system which produces intense and sharply defined images.

It is yet another object of this invention to provide a transient imaging system.

It is another object of this invention to provide an imaging or display system having image memory capability.

It is another object of this invention to provide an imaging system suitable for use in display devices which may be addressed by various, thermal and electrical means.

It is yet another object of this invention to permit a cholesteric liquid crystalline material in a field-induced texture to relax back into its initial texture state.

It is yet another object of this invention to produce a color display system.

The foregoing objects and others are accomplished in accordance with this invention by a system transforming a cholesteric liquid crystalline material from its Grandjean or "disturbed" texture state to its focal-conic or "undisturbed" texture state, by an applied electrical field, and an imaging system wherein the electrical field-induced texture transition images a cholesteric liquid crystalline member in a desired image configuration.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENT

Figure 1:
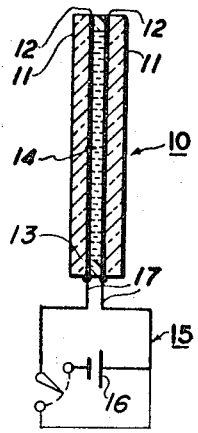
FIG. 1 is a partially schematic cross-sectional view of a liquid crystalline imaging member.

In FIG. 1 a typical liquid crystalline imaging member 10, sometimes referred to as an electroded imaging sandwich, is shown in partially schematic cross section where a pair of transparent plates 11 having substantially transparent conductive coating 12 upon the contact surface, comprise a parallel pair of substantially transparent electrodes. An imaging member wherein both electrodes are transparent is preferred where the imaging member is to be viewed using transmitted light; however, a liquid crystalline imaging member may also be viewed using reflected light thereby requiring only a single transparent electrode while the other may be opaque. The transparent electrodes are separated by spacing member 13 which contains voids which form one or more shallow cups which contain the liquid crystalline film or layer which comprises the active element of the imaging member. A field is created between the electrodes by an external circuit 15 which typically comprises a source of potential 16 which is connected across the two electrodes through leads 17. The circuit 15 may also contain suitable switching means. The potential source may be either DC, AC, or a combination thereof.

In the advantageous system of the present invention it has been discovered that when cholesteric liquids crystals or a mixture of cholesteric liquid crystalline substances is used in an electrode sandwich such as described in FIG. 1, that electrical fields across the liquid crystalline film cause an electrical field-induced texture transition to occur wherein a cholesteric liquid crystalline material initially in its Grandjean or "disturbed" texture is transformed to its focal-conic or "undisturbed" texture. The Grandjean texture is typically characterized by selective dispersion of incident light around a wavelength $\lambda_o$ (where $\lambda_o = 2np$ where $n$ = the index of refraction of the liquid crystalline film and $p$ = the pitch of the liquid crystalline film) and optical activity for wavelengths of incident light away from $\lambda_o$. If $\lambda_o$ is in the visible spectrum, the liquid crystalline film appears to have the color corresponding to $\lambda_o$, and if $\lambda_o$ is outside the visible spectrum the film appears colorless and nonscattering. The Grandjean texture of cholesteric liquid crystals is sometimes referred to as the "disturbed" texture.

The focal-conic texture is also typically characterized by selective dispersion but in addition this texture also exhibits diffuse scattering in the visible spectrum, whether $\lambda_o$ is in the visible spectrum or not. The appearance of the focal-conic texture state is typically milky-white when $\lambda_o$ is outside the visible spectrum. The focal-conic texture of cholesteric liquid crystals is sometimes referred to as the "undisturbed" texture.

Figure 4:
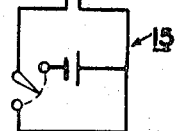
FIG. 4 is a partially schematic isometric view of an embodiment wherein a typical liquid crystalline imaging member is viewed between polarizers.
Figure 4:
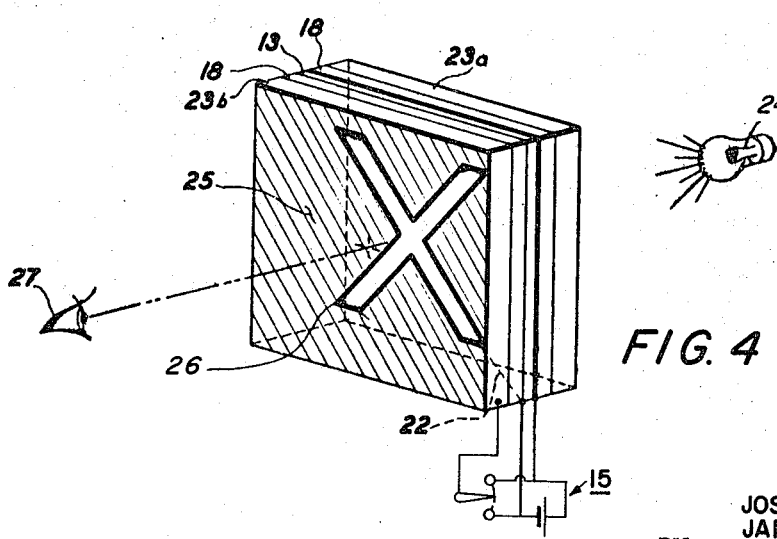

For example, in the inventive system when cholesteric liquid crystals are placed in the unbiased electrode sandwich, they initially appear colored, or colorless and transparent. If the electrode sandwich is observed between polarizers as illustrated in FIG. 4, the imaging sandwich appears colored or black. When the electrical field is placed across the liquid crystalline film, the field-induced texture change is observable because the liquid crystalline film becomes white in the imaged area when the imaging sandwich is observed in transmitted or reflected light. The described imaging system thereby produces a white image on a dark or colored background. However, it is clear that either field or nonfield areas in the liquid crystalline imaging sandwich may be used to create the desired image, with or without the use of polarizers or other image enhancing devices.

The apparatus and materials used in the inventive system are typically similar to those used in the system described in copending application Ser. No. 821,565, filed May 5, 1969. However, the advantageous process of the present invention produces an entirely different effect than the processes described in application Ser. No. 821,565. Typically, for example, the voltages and field strengths used for imaging the liquid crystal imaging members in the present invention have lower values than those used in the previous system, wherein an optically negative liquid crystalline substance is transformed to an optically positive liquid crystalline substance in the cholesteric-nematic phase transition disclosed and claimed in application Ser. No. 821,565.

In the liquid crystal imaging member described in FIG. 1 the electrodes may be of any suitable transparent conductive material. Typical suitable transparent, conductive electrodes include glass or plastic substrates having substantially transparent and continuously conductive coatings of conductors such as tin, indium oxide, aluminum, chromium, tin oxide, or any other suitable conductor. These substantially transparent conductive coatings are typically evaporated onto the more insulating, transparent substrate. NESA glass, a tin oxide coated glass manufactured by the Pittsburgh Plate Glass Company, is a commercially available example of a typical transparent, conductive electrode material.

The spacer, 13 in FIG. 1, which separates the transparent electrodes and contains the liquid crystal film between said electrodes, is typically chemically inert, transparent, substantially insulating and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate, and mixtures thereof.

Such spacers, which also approximately define the thickness of the imaging layer or film of liquid crystals, are preferably of a thickness in the range of about 10 mils or less. Optimum results are typically attained with spacers in the thickness range between about one-fourth mil and about 5 mils.

The liquid crystal imaging film 14 may comprise any suitable cholesteric liquid crystal or mixture of cholesteric liquid crystals. Typical cholesteric liquid crystals include derivatives from reactions of cholesterol and inorganic acids; for example, cholesteryl chloride, cholesteryl bromide, cholesteryl iodide, cholesteryl nitrate; esters derived from reactions of cholesterol and carboxylic acids; for example cholesteryl crotonate; cholesteryl nonanoate; cholesteryl hexanoate; cholesteryl formate; cholesteryl docosonoate; cholesteryl chloroformate; cholesteryl propionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl heptyl carbamate; and alkyl amides and aliphatic secondary amines derived from 3,$\beta$-amino-$\Delta$,5-cholestene and mixtures thereof; peptides such as poly-$\gamma$-benzyl-$\phi$-glutamate; derivatives of beta sitosterol such as sitosteryl chloride; and active amyl ester of cyano benzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

The liquid crystal imaging layers or films are preferably of a thickness in the range of about 10 mils or less. Optimum results are typically attained with layers in the range of thicknesses between about one-fourth mil and about 5 mils.

In addition to the above cholesteric liquid crystalline materials, the imaging film or layer may comprise mixtures of cholesteric and nematic liquid crystalline materials. For example, mixtures like cholesteryl chloride: cholesteryl nonanoate: N-p-methoxy-benzylidene-p-phenylazoanite; or cholesteryl chloride: cholesteryl nonanoate: p-azoxyanizole; or cholesteryl chloride: cholesteryl nonanoate: cholesteryl oleyl carbonate: p-azoxyanizole may be used.

Other nematic liquid crystalline materials suitable for use in imaging mixtures in the present invention include: p-azoxyanisole, p-azoxyphenetole, p-butoxybenzoic, p-methoxy cinnaminic acid, butyl-p-anisylidene-p'-aminocinnamate, anisylidene para-amino-phenylacetate, p-ethoxy-benzalamino-a-methyl-cinnamic acid 1,4-bis(p-ethoxy benzylidene) cyclo hexanone, 4,4'-dihexyloxybenzene, 4,4'-diheptyloxybenzene, anisal-p-amino-azo-benzene, anisaldazine, a-benzeneazo-(anisal-$\alpha$'-naphthylamine), n,n'-nonoxybenzaltoluidine, mixtures of the above and many others.

Mixtures of liquid crystals can be prepared in organic solvents such as chloroform, petroleum ether, methylethyl ketone and others, which are typically subsequently evaporated from the mixture thereby leaving the liquid crystalline mixture. Alternatively, the individual liquid crystals of the liquid crystalline mixture can be combined directly by heating the mixed components above the isotropic transition temperature.

Figure 2:
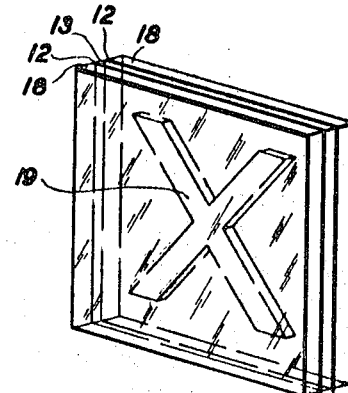
FIG. 2 is a partially schematic isometric view of an embodiment of a liquid crystalline imaging member wherein the desired image is defined by the shape of the liquid crystalline material as confined by the shape of the spacing member.

In FIG. 2 the embodiment of the liquid crystal imaging member described in FIG. 1 is shown with the desired image defined by the shape of the void areas in the spacer gasket 13. As before, transparent electrodes 18 are separated by the spacer 13, but the entire desired image area 19 comprises the liquid crystal film or layer. In this embodiment the entire inner faces of the transparent electrodes comprise substantially transparent conductive coating 12 and the conductive coatings are electrically connected to external circuit 15. In operation there is an electrical field across the entire area of the spacer 13, however the image caused by the electrical field-induced texture change in the liquid crystal film, causes imaging to occur only in the area 19 where the liquid crystal film is present. Again here, depending upon whether the desired image is to be viewed by transmitted or reflected light, both or only one of the electrodes, respectively, may be transparent.

Figure 3:
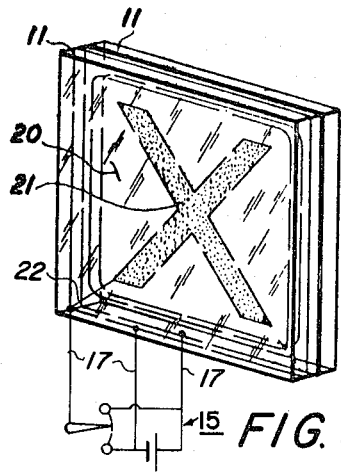
FIG. 3 is a partially schematic isometric view of an embodiment of a liquid crystalline imaging member wherein the desired image is defined by the shape of at least one of the electrodes.

In FIG. 3 another preferred embodiment of the liquid crystal imaging member described in FIG. 1 is shown. In FIG. 3 the desired image is defined by the shape of an electrode, and therefore by the shape of the corresponding electrical field. The imaging member here comprises transparent plates 11 separated by spacer gasket 13 having void area 20 filled with liquid crystals, said area comprising substantially the entire area of spacer layer 13. The desired image is defined by the shape of the substantially transparent conductive coating shown at 21, which is affixed to the inner surface of one or both of the transparent support plates 11, and is typically affixed only in the desired image configuration. The embodiment illustrated in FIG. 3 shows only one of the two electrodes in image configuration, however it will be understood by those skilled in the art that both electrodes could easily be made in a matched pair to define the same desired image. When the single image electrode configuration is used, the second electrode will comprise transparent plate 11 with substantially transparent conductive coating 12 upon the entire area of the inner surface of the transparent electrode. It is noted that a very thin, or substantially invisible conductor 22 is typically used in this embodiment to electrically connect the electrode in the desired image configuration to external circuit 15 which is similarly connected to the conductive coating of the opposite electrode. In operation this embodiment will produce an electric field only in areas where there are parallel electrodes, i.e., between the electrode in the desired image configuration, and the opposite electrode, whether or not the second electrode is also in the desired image configuration. Again here, one of the electrodes may be opaque if it is desired to observe the imaged member by reflected light rather than transmitted light.

In addition, where the desired image is defined by the shape of one or more electrodes, an electrode may be shaped in the configuration of the background of the desired image, and an imagewise electrode and such a corresponding background electrode may be coplanar and insulated from one another by an open space or insulating material. Such a coplanar pair of electrodes may be operated simultaneously as a substantially full-area electrode.

In FIG. 4 a liquid crystal imaging member comprising a pair of substantially transparent electrodes 18 sandwiching a spacer 13 containing a liquid crystal film is shown being observed between polarizers 23. As described earlier, cholesteric liquid crystals are typically selectively dispersive and when placed in the electrical field characteristic of the advantageous system of the present invention, the Grandjean to focal-conic texture change occurs thereby rendering the transformed portion of the liquid crystalline film more diffusely light scattering in transmitted or reflected light. At the same time, those areas remaining in the Grandjean texture state continue to be selectively dispersive. When such a liquid crystalline imaging sandwich is observed between polarizers, light from source 24 is plane polarized while passing through polarizer 23a, selectively dispersed by the liquid crystals in the Grandjean texture in nonimage area 25 (same as 20 in FIG. 3), and is more fully transmitted by the more diffusely scattering effect of the focal-conic textured image area 26. A viewer 27 then sees the planar polarized light which passes through polarizer 23b which originated from source 24 and was scattered and passed through the image portion of spacer 13. Although the light was polarized by polarizer 23a in a plane crossed with the plane of polarizer 23b, the scattering effect of the cholesteric liquid crystal between the substantially transparent electrodes scattered sufficient amounts of the originally planar-polarized light to allow some of it to pass through polarizer 23b. However, in the nonimage areas 26 where the liquid crystals remain in their Grandjean texture state, the effect of polarizers 23, when said polarizers have their respective planes of polarization crossed, is to cut off some or all of the light transmitted through polarizer 23a and transformed nonimage areas 26 so that those areas 26 appears colored or dark to the observer.

Although the embodiment of the advantageous system of the present invention illustrated in FIG. 4 shows a liquid Crystalline imaging member being observed between polarizers, it will be appreciated that any other means for enhancing the image or nonimage areas may perform a function similar to that of the polarizers in the illustrated embodiment. For example, in addition to polarizers, edge-lighting systems, optical filter systems or various other means may be used to enhance the quality of the desired image. It is therefore clear that any desired image may be created in dark-on-light, light-on-dark colored-on-light, light-on-colored, colored-on-dark, or dark-on-colored image-background combinations.

In addition to the electrode sandwich systems described above, it is clear that any method of producing an electrical field across a liquid crystalline imaging layer is suitable for use in the advantageous system of the present invention. For example, in various other embodiments liquid crystalline imaging layers may be imaged by the texture change system wherein the electrical field is produced by an electron beam address system or by an x-y address system which may be selectively or sequentially operated to image any desired portion of the liquid crystalline imaging layer, or by an electrostatic latent image on an image support surface, such as a xerographic plate, in proximity with the liquid crystalline layer. It is again noted that the sources of potential used to produce the electrical fields used to operate the inventive system may typically be of either polarity, and may be either AC, or DC, or combinations thereof.

In addition, the cholesteric liquid crystalline imaging member of the present invention may be imaged by thermal address systems. For example, a cholesteric imaging material in an electric field having a field strength smaller than the texture change threshold field, may have a thermal image projected thereon so that the material within the projected thermal image achieves the corresponding temperature threshold for the texture change. Similarly, various other means of selectively heating or cooling desired image or background portions of such an imaging layer may produce a desired image in accordance with the inventive system.

In still other embodiments of imaging cells using the advantageous system of the present invention, a plurality of individual cells may be arranged in a coplanar configuration wherein one or more of the individual cells may be activated in image or background configuration to achieve any desired figure or character across the entire area of or a portion of the uniplanar, multiple cell imaging device. It will be appreciated, that any and all of the imaging cells of the present invention may be constructed to create any desired figure or character in any language or number system or any other desired design or image according to the application desired by its user.

The advantageous texture change system of the present invention has also been found to be suitable as a transient display when the electrical fields across the liquid crystalline imaging layer are decreased to a value below the field strengths necessary to cause the desirable texture change imaging. When field strengths drop below the threshold value, the field-induced image slowly resumes its original texture over a period of time which may vary from fractions of a second to minutes or hours, depending upon the specific embodiment, materials, temperatures, material viscosities and other conditions used in the inventive system. Where the resumption of the original texture takes place over a long period of time, this memory characteristic of the liquid crystal imaging material may be useful in applications where it is desirable to preserve an image for some time after its formation. Such memory or transient imaging systems may make use of all or any portion of the relaxation transition period wherein the liquid crystalline imaging material transforms from its focal-conic texture back into its Grandjean texture. These transient relaxation displays also exhibit color changes as the material resumes the Grandjean texture.

Where it is desirable to expedite the transformation of the liquid crystalline imaging layer back into the Grandjean texture from the focal-conic texture, means other than natural relaxation of the material may be used to achieve this transition. For example, the liquid crystalline sample may be disturbed mechanically by displacing the top and bottom plates of the sample with respect to each other. Another method of achieving the focal-conic texture includes heating the sample to its isotropic state and then cooling the sample. This later method may be enhanced if the sample is cooled while under mechanical pressure. Various other means may also be suitable for transforming the material in its imaged, focal-conic texture back into its initial, Grandjean texture.

The following examples further specifically define the present invention with respect to transforming a cholesteric liquid crystalline material in the Grandjean or "disturbed"

texture into its focal-conic or "undisturbed" texture by the application of an electrical field. The parts and percentages are by weight unless otherwise indicated. The examples below are intended to illustrate various preferred embodiments of the novel liquid crystal imaging system.

EXAMPLE I

A liquid crystal imaging cell for observing the electrical field-induced texture change is prepared as follows: a mixture of liquid crystalline materials of about 59 percent cholesteryl chloride and about 41 percent cholesteryl nonanoate is prepared. A layer of the liquid crystalline mixture is placed between and in contact with a pair of substantially transparent electrodes of NESA coated glass available from the Pittsburgh Plate Glass Company. The transparent electrodes are separated by about 1½ mils by a Mylar spacer, made of Mylar polyester resin available from DuPont. The electrodes are connected in circuit with an electrical generator and a source of white light is placed behind the imaging sandwich.

The liquid crystalline layer initially appears substantially clear. The electrical field is then applied across the imaging layer. In the presence of the field, the imaged portion of the liquid crystal imaging layer assumes a white, light-scattering appearance. The threshold voltage for the about 1½ mil sample is about 15 volts at about 25° C., or a field strength of about $4 \times 10^3$ volts per centimeter. At voltages slightly above this threshold, the Grandjean to focal-conic texture change is clearly observable in this system.

The cholesteric-nematic phase transition as described in copending application Ser. No. 821,565, filed May 5, 1969, occurs for this mixture of liquid crystals at about 100 volts at about 25° C., or at field strengths of about $3 \times 10^4$ volts per centimeter.

EXAMPLE II

The imaging cell of Example I is used with a mixture of liquid crystalline materials of about 55 percent cholesteryl chloride and about 45 percent cholesteryl nonanoate. The threshold voltage for this approximately 1½ mil sample is about 30 volts at about 25° C., or a field strength of about $8 \times 10^3$ volts per centimeter. The Grandjean to focal-conic texture change is clearly observable in this cell.

The cholesteric-nematic phase transition as described in copending application Ser. No. 821,565, occurs for this mixture of liquid crystals at about 400 volts at about 25° C., or at field strengths of about $1 \times 10^5$ volts per centimeter.

EXAMPLE III

A liquid crystal imaging cell similar to the one described in Example I is prepared using a mixture of liquid crystalline materials of about 30 percent cholesteryl chloride, about 56 percent cholesteryl nonanoate, and about 14 percent oleyl cholesteryl carbonate. The transparent electrodes in this cell are separated by about 3 mils by a spacer of Teflon, a tetrafluoroethylene fluorocarbon resin film available from DuPont. The texture change threshold voltage for the about 3-mil sample is about 100 volts at about 25° C., or a field strength of about $1.3 \times 10^4$ volts per centimeter. Again in this system the texture change imaging is clearly observable. The cholesteric-nematic phase transition threshold for this system is about $3.7 \times 10^5$ volts/cm. at about 25° C.

EXAMPLES IV-VI

The Grandjean to focal-conic texture change is observed in the cell of Example I using the following mixtures of cholesteric liquid crystals as the imaging layer:

IV. About 20.8 percent cholesteryl chloride; about 38.7 percent cholesteryl nonanoate; and about 40.5 percent oleyl cholesteryl carbonate.

V. About 23.2 percent cholesteryl chloride; about 43 percent cholesteryl nonanoate; and about 33.8 percent oleyl cholesteryl carbonate.

VI. About 48 percent cholesteryl chloride and about 52 percent cholesteryl propionate.

EXAMPLE VII

Another embodiment of a liquid crystal imaging cell suitable for observing the electrical field-induced texture change is prepared as follows: the substantially transparent electrode plates are prepared having a grid pattern of substantially transparent conductive strips separated by insulating spaces. The conducting strips comprise evaporated lines of chromium. The two substantially transparent grid electrode plates are placed on opposite sides of a liquid crystalline imaging layer contained by a Teflon spacer (a tetrafluoroethylene fluorocarbon resin film available from DuPont) about 1 mil in thickness, and the grid plates are aligned so that the grid lines of one plate are perpendicular to the lines on the opposite grid plate. A mixture of liquid crystalline imaging materials comprising about 55.6 percent cholesteryl chloride, about 37 percent cholesteryl nonanoate, and about 7.4 percent N-phenyl-1-naphthylamine is placed within the void space in the Teflon spacer. The imaging material is initially in the Grandjean texture state. Electrical apparatus is provided to sequentially scan the grid lines on each substantially transparent electrode with a voltage which is below the threshold voltage value for texture change in this system. Using this mixture of liquid crystalline materials at about room temperature, the threshold voltage is about 10 volts, so that a voltage of about 5 volts may be used to scan the grid lines on each of the substantially transparent electrode plates. The polarity of the voltage applied to the grid lines on each plate is such that in the areas between the intersection of individual grid lines on the opposite plates when the voltage is applied to the individual lines on said opposite plates, the voltages applied create a field across the liquid crystalline imaging material of field strength in excess of the threshold field strength of the material in that region so that the texture change imaging of the present invention takes place in that region. By the application of voltage to any desired combination of lines on the opposite electrodes, various regions of the imaging layer may be imaged to create any desired composite image across the entire area of the imaging cell. Once imaged the texture-change inducing fields are removed, and the materials used in this embodiment continue to exhibit the image, in the memory display mode, for a period of about 25 minutes at about 25° C. This 25-minute period represents the period of time which the imaging material naturally takes to relax from its electric field-induced focal-conic texture back into its initial Grandjean texture state.

EXAMPLE VIII

An imaging cell as described in Example VII is imaged using a mixture of about 60 percent cholesteryl chloride and about 40 percent cholesteryl nonanoate as the imaging member. The texture change inducing fields are removed, and this system acts as a memory display, retaining the image for several hours at about 25° C.

Although specific components and proportions have been stated in the above description of the preferred embodiments of the electrical field-induced texture change imaging system for liquid crystalline materials, other suitable materials and variations of the various steps in the system as listed herein, may be used with satisfactory results in various degrees of quality. In addition, other materials and steps may be added to those used herein and variations may be made in the process to synergize, enhance or otherwise modify the properties of the invention. For example, various other mixtures of liquid crystals which will undergo the inventive texture change may be discovered and used in the system of the present invention, and such mixtures may require somewhat different thicknesses, threshold fields and temperature ranges for preferred results. Likewise, various other means for creating the electrical field or projecting thermal images to alter the threshold voltage and to address the inventive imaging member may be used with satisfactory results in the inventive system.

It will be understood that various other changes in the details, materials, steps, and arrangements of elements which have been herein described and illustrated in order to explain the nature of the invention, will occur to and may be made by those skilled in the art, upon a reading of this disclosure, and such changes are intended to be included within the principle and scope of this invention.

We claim:

1. The method of transforming a liquid crystalline material comprising cholesteric liquid crystalline material from its Grandjean texture to its focal-conic texture, comprising:

providing the cholesteric liquid crystalline material in its Grandjean texture state substantially uniformly throughout the surface area of said material, and applying an electrical field across said liquid crystalline material within the Grandjean to focal-conic transition electrical field strength range of said liquid crystalline material of sufficient strength to cause said liquid crystalline material to assume its focal-conic texture state substantially uniformly throughout the portion of the area of the liquid crystalline material to which the electric field is applied.

2. The method of claim 1 wherein said step of applying an electrical field comprises applying a field of field strength below the cholesteric-nematic transition field strength for said liquid crystalline material.

3. The method of claim 1 wherein the step of providing the cholesteric liquid crystalline material comprises providing a material selected from the group consisting of: cholesteryl chloride, cholesteryl nonanoate, oleyl cholesteryl carbonate, cholesteryl propionate, N-phenyl-1-naphthylamine, napthylamine, and mixtures thereof.

4. The method of claim 1 additionally comprising the step of providing a mixture of said cholesteric liquid crystalline material with nematic liquid crystalline materials.

5. The method of claim 1 wherein the step of providing the cholesteric liquid crystalline material comprises providing a layer of said material of thickness not greater than about 10 mils.

6. The method of claim 5 wherein said step of providing a layer of liquid crystalline material comprises providing a layer of a thickness in the range between about one-fourth and about 5 mils.

* * * * *